United States Patent
Shim

[19]
[11] Patent Number: 5,996,081
[45] Date of Patent: Nov. 30, 1999

[54] SYSTEM HAVING SERIES CONTROLLERS FOR CONTROLLING SUSPENDING OF POWER TO ASSOCIATE CORE BLOCKS BASED ON SUSPENDING SIGNAL AND SIGNAL INDICATORS THAT THE CONVERTED DATA IS INVALID

[75] Inventor: Jae Ryun Shim, Daeku-si, Rep. of Korea

[73] Assignee: LG Semicon Co., Ltd., Cheongju-Si, Rep. of Korea

[21] Appl. No.: 09/031,680

[22] Filed: Feb. 27, 1998

[30] Foreign Application Priority Data

Feb. 28, 1997 [KR] Rep. of Korea .................... 6684/1997

[51] Int. Cl.$^6$ ........................................ G06F 1/32
[52] U.S. Cl. ........................ 713/320; 713/324; 713/340
[58] Field of Search .................................. 713/300, 320, 713/322, 321, 324, 340; 710/104; 712/212; 307/125; 363/156

[56] References Cited

U.S. PATENT DOCUMENTS

| | | | |
|---|---|---|---|
| 4,381,552 | 4/1983 | Nocilini et al. | 713/321 |
| 4,747,041 | 5/1988 | Engel et al. | 713/324 |
| 5,167,024 | 11/1992 | Smith et al. | 713/322 |
| 5,276,824 | 1/1994 | Skruhak et al. | 712/212 |
| 5,461,266 | 10/1995 | Koreeda et al. | 307/125 |
| 5,502,689 | 3/1996 | Peterson et al. | 368/156 |
| 5,511,203 | 4/1996 | Wisor et al. | 713/322 |
| 5,655,124 | 8/1997 | Lin | 713/322 |
| 5,719,800 | 2/1998 | Mittal et al. | 713/321 |
| 5,737,616 | 4/1998 | Watanabe | 713/340 |
| 5,790,810 | 8/1998 | Kaba | 710/104 |
| 5,815,724 | 9/1998 | Mates | 713/324 |
| 5,860,016 | 1/1999 | Nookala | 713/324 |

*Primary Examiner*—Meng-Ai T. An
*Assistant Examiner*—Walter Benson

[57] ABSTRACT

An apparatus for suspending power of a processing system having a plurality of core blocks connected in series includes a system controller which receives input data and determines whether to suspend a supply of power to the processing system based on the input data. A converter converts a format of the input data, and a determining unit determines whether the converted input data is valid data. Valid data is data which will be processed by the plurality of core blocks. A series of controllers in the apparatus shift output from the determining unit through the series of controllers. Each controller temporarily stores the output from the determining unit prior to shifting the output from the determining unit to a next controller in the series of controllers. Also, each controller is associated with one of the plurality of core blocks, and controls a supply of power to the associated core block based on output from the system controller and the output from the determining unit temporarily stored therein.

13 Claims, 3 Drawing Sheets

SYSTEM HAVING SERIES CONTROLLERS FOR CONTROLLING SUSPENDING OF POWER TO ASSOCIATE CORE BLOCKS BASED ON SUSPENDING SIGNAL AND SIGNAL INDICATORS THAT THE CONVERTED DATA IS INVALID

BACKGROUND OF THE INVENTION

1. Field of the Invention

The present invention relates to a method and apparatus for suspending power, and more particularly, to a method and apparatus for suspending power which increase efficiency and reduce noise.

2. Description of Related Art

Generally, signal processing circuits operating as state machines input data in series, convert the series data to parallel data, and core blocks of the signal processing circuit process the parallel data. A conventional power suspending unit for such a signal processing circuit will now be described.

FIG. 1 is a block diagram illustrating a conventional power suspending unit. As shown in FIG. 1, series input data is received by a converter 14 which converts the series input data into parallel data. A memory 15 stores the parallel data, and outputs the parallel data to a first core block 16 in a series of core blocks 16. Each of the core blocks 16 in the series of core blocks 16 processes the parallel data, and passes the output thereof onto the next core block 16.

As shown in FIG. 1, the power suspending unit further includes a detector 11 which detects a predetermined bit stream in the input data. The predetermined bit stream represents data on which the series of core blocks 16 will not operate.

A counter 12 receives the output of the detector 11, and for each match between the predetermined bit stream and the series input data, increases a count value by 1. When the detector 11 does not determine a match between the predetermined bit stream and the series input data, the counter 12 resets the count value to 0.

A controller 13 receives the count value, and compares the count value to a predetermined threshold. When the controller 13 determines that the count value exceeds the predetermined threshold, the controller 13 outputs a suspending signal to the core blocks 16 to suspend the supply of power to the core blocks 16.

FIG. 2 illustrates the various signals received and produced by the power suspending unit illustrated in FIG. 1. FIG. 2a illustrates the serial input data received by the converter 14 and the detector 11. FIG. 2b illustrates a clock which controls the timing of processing performed in the power suspending unit. FIG. 2c is representative of the predetermined bit stream.

As shown in FIG. 2d, when the predetermined bit stream matches the serial input data, the counter 12 increases the count value by 1. As further shown in FIG. 2d, the count value is increased by 1 until a count value of 10 is reached. For the purposes of explanation, if the predetermined count threshold is established as 9, then when the count value reaches 10 as shown in FIG. 2d, a power suspending signal is output by the controller 13 to the plurality of core blocks 16 to suspend the supply of power to the core blocks 16. As shown in FIG. 2e, the power suspending signal goes from a logic high state to a logic low state to suspend the supply of power to the core blocks 16. Should the count value be reset to 0 upon receipt of series input data which does not match the predetermined bit stream, the suspending signal will resume its high state, and the core blocks 16 will receive power once again.

The above-described conventional power suspending unit suffers from several problems. First, since the power suspension is determined by detecting only the serial input data, the power suspension cannot be controlled on a core block by core block basis. Consequently, core blocks which do not need power are supplied with power; thus, reducing efficiency. In addition, because core blocks which do not need to be operating or supplied with power, the noise level in the system is increased.

SUMMARY OF THE INVENTION

An object of the present invention is to provide a method and apparatus for suspending power that substantially obviates one or more of the problems due to limitations and disadvantages of the related art.

A further object of the present invention is to provide an apparatus and method for suspending power having increased efficiency and reduced noise.

Another object of the present invention is to provide an apparatus and method for suspending power which individually controls the supply of power to a plurality of core blocks.

These and other objectives are achieved by providing an apparatus for suspending power of a processing system having a plurality of core blocks connected in series, comprising: system power suspending means for receiving input data, and determining whether to suspend a supply of power to said processing system based on said input data; a converter converting a format of said input data; determining means for determining whether said converted input data is valid data, said valid data being data which will be processed by said plurality of core blocks; and a series of controllers shifting output from said determining means through said series of controllers, each controller temporarily storing said output from said determining means prior to shifting said output from said determining means to a next controller in said series of controllers, each controller being associated with one of said plurality of core blocks and controlling a supply of power to said associated core block based on output from said system power suspending means and said output from said determining means temporarily stored therein.

These and other objectives are further achieved by providing a method for suspending power of a processing system having a plurality of core blocks connected in series, comprising: (a) receiving input data; (b) determining whether to suspend a supply of power to said processing system based on said input data; (c) converting a format of said input data; (d) determining whether said converted input data is valid data, said valid data being data which will be processed by said plurality of core blocks; (e) shifting output from said step (d) through a series of controllers such that each controller temporarily stores said output from said step (d) prior to shifting said output from said step (d) to a next controller in said series of controllers, each controller being associated with one of said plurality of core blocks; and (f) controlling, using each controller, a supply of power to said associated core block based on output from said step (b) and said output from said step (d) temporarily stored in said controller.

Other objects, features, and characteristics of the resent invention; methods, operation, and functions of the elated elements of the structure; combination of parts; and conomies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
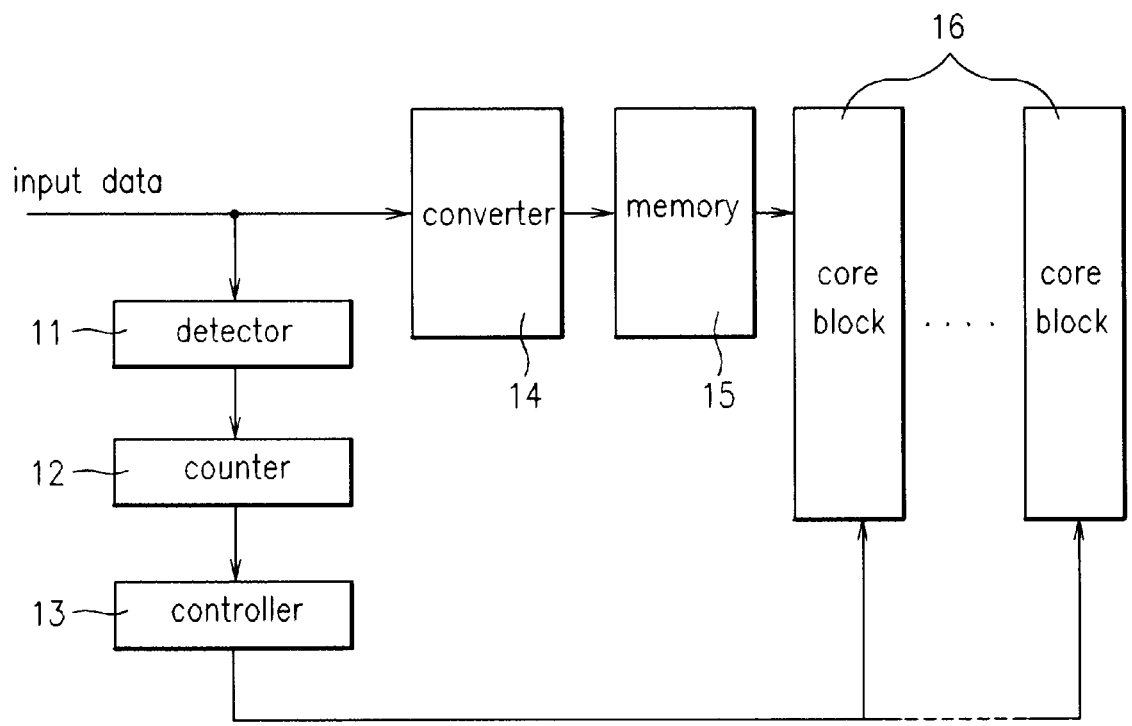
FIG. 1 illustrates a conventional power suspending unit.
Figure 2A:
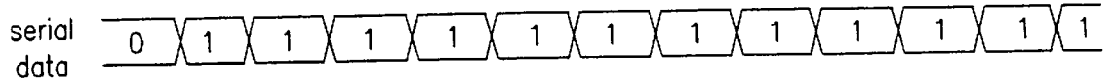
FIGS. 2a–2e illustrate signals received and output by the various components in the conventional power suspending unit.
Figure 2B:
Figure 2C:
Figure 2D:
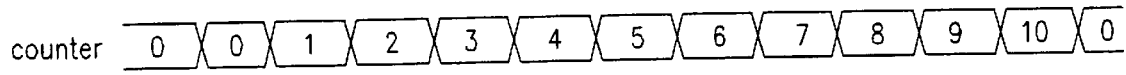
Figure 2E:
Figure 3:
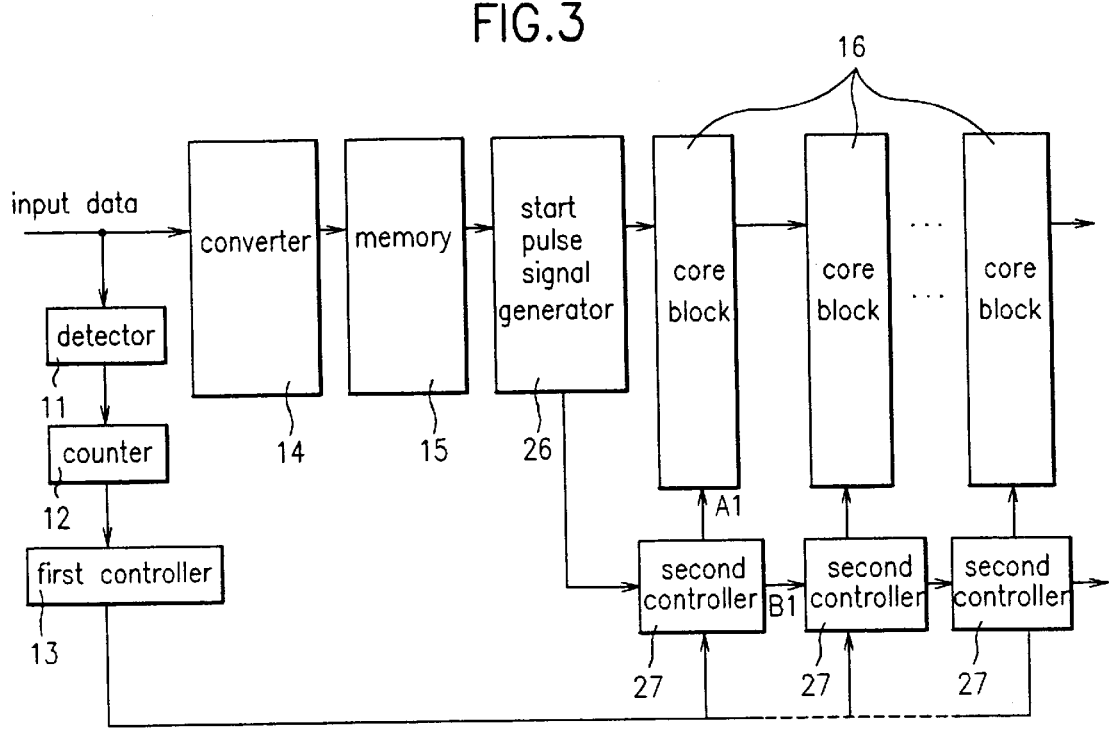
FIG. 3 illustrates a power suspending unit according to the present invention.

FIG. 3 illustrates a power suspending unit according to the present invention. As shown in FIG. 3, the power suspending unit according to the present invention includes the detector 11, the counter 12, the first controller 13, the converter 14, and the memory 15 as described above in detail with respect to the conventional art of FIG. 1. Accordingly, the operation and interconnection of these components will not be discussed in detail.

The parallel data output from the memory 15 is supplied to a start pulse signal generator 26. The start pulse signal generator 26 determines whether the parallel data is valid (i.e., will be processed by the plurality of core blocks 16), and outputs a validity signal indicative of the determination to the first of a plurality of second controllers 27.

As shown in FIG. 3, a plurality of second controllers 27 are connected in series, with each one of the second controllers 27 associated with one of the plurality of core blocks 16. The validity signal from the start pulse signal generator 26 is shifted from second controller 27 to second controller 27 as the parallel data, corresponding to the validity signal, is processed associated core block 16 by associated core block 16. The plurality of second controllers 27 also receive the power suspending signal output by the first controller 13. Based on the power suspending signal from the first controller 13 and the validity signal temporarily stored therein, each second controller 27 determines whether to suspend power to the associated core block 16. Each second controller 27 then outputs a power suspension signal to the associated core block 16 in accordance with this determination.

Figure 4:
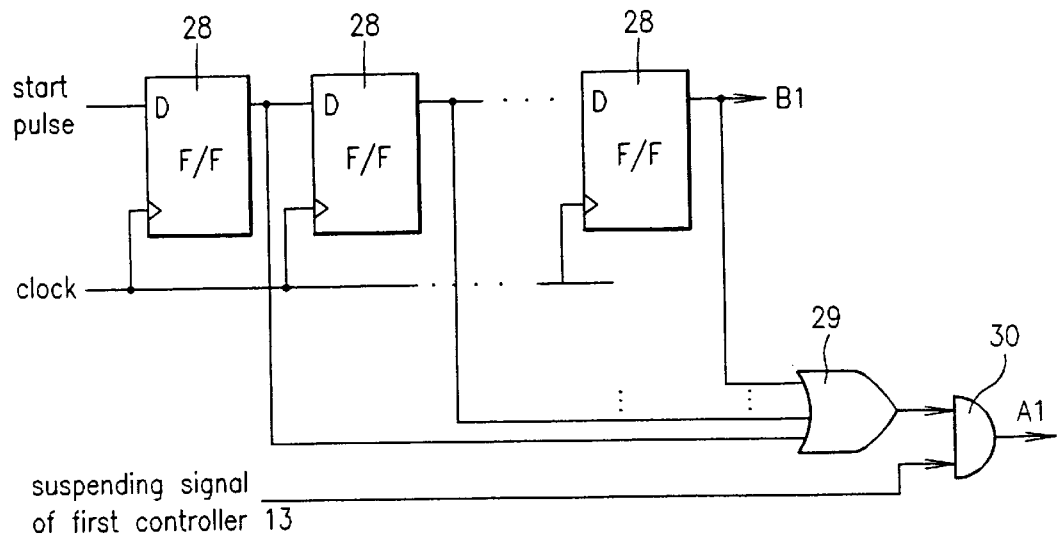
FIG. 4 is a detailed block diagram of a second controller in the power suspending unit of FIG. 3.

FIG. 4 is a detailed block diagram of a second controller 27. As shown in FIG. 4, the second controller 27 includes a plurality of D-flip/flops 28 connected to in series. Each D-flip/flop 28 receives a clock signal to control the operational timing thereof. The first D-flip/flop 28, in the series of D-flip/flops 28, receives (1) the validity signal output from the start pulse signal generator 26 if FIG. 4 represents the first second controller 27 in the series of second controllers 27, or (2) the validity signal output from the previous second controller 27 in the series of second controllers 27 if FIG. 4 does not represent the first second controller 27 in the series of second controllers 27. The output of the last D-flip/flop 28 in the series of D-flip/flops 28 is supplied to the next second controller 27 in the series of second controllers 27.

The output of each D-flip/flop 28 is connected to an OR gate 29, and the output of the OR gate 29 along with the power suspension signal from the first controller 13 is supplied to an AND gate 30. The output of the AND gate 30 is supplied as the power suspension signal to the associated core block 16.

The operation of the power suspending unit according to the present invention will now be described.

As discussed above, the detector 11, the counter 12, and the first controller 13 operate in the same manner as discussed above with respect to FIG. 1. Accordingly, when the number of times a predetermined bit stream appears in the series input data exceeds a predetermined threshold, the first controller 13 generates a power suspending signal. Namely, the first controller 13 outputs a logic low level signal.

By contrast, the start pulse signal generator 26 receives the parallel data output from memory 15, and determines whether the core blocks 16 will operate upon that parallel data. Because the processing protocol of the signal processing circuit is known, parallel data which will be processed by the plurality of core blocks 16 is also known. Consequently, by comparing the parallel data received from the memory 15 to known parallel data which the plurality of core blocks 16 will process, the start pulse signal generator 26 can determine whether or not the parallel data received from the memory 15 will be processed by the plurality of core blocks 16. It should be understood of course, that many different methods of determining whether data will be processed by the plurality of core blocks 16 can be used.

When the start pulse signal generator 26 determines that the parallel data will be processed by the plurality of core blocks 16, the start pulse signal generator 26 outputs a logic high validity signal, and when the start pulse signal generator 26 determines that the parallel data will not be processed by the plurality of core blocks 16, the start pulse signal generator 26 outputs a logic low validity signal.

The validity signal output by the start pulse signal generator 26 is sequentially clocked through the series of D-flip/flops 28 in each second controller 27. Accordingly, during the period of time that the parallel data is supplied to the first core block 16 in the series of core block 16, the associated second controller 27 will clock the validity signal associated with that parallel data through the D-flip/flops 28. As the parallel data is passed from core block 16 to core block 16, the validity signal associated therewith is passed to the series of D-flip/flops 28 in the corresponding second controller 27.

For each second controller 27, if one of the D-flip/flops 28 therein stores a validity signal having a logic high state, then the OR gate 29 in the second controller 27 outputs a logic high signal to the AND gate 30. If the AND gate 30 also receives a power suspension signal from the first controller 13 having a logic high state (i.e., no power suspension), then AND gate 30 outputs a logic high signal to the associated core block 16. The output of the AND gate 30 serves as the power suspension signal for the associated core block 16. When the output of the AND gate 30 is a logic high state, the supply of power to the associated core block 16 is not suspended.

If, however, the output of the AND gate 30 is a logic low state, then the associated core block 16 has its power suspended. The AND gate 30 outputs a signal having a logic low state when a logic low power suspension signal is received from the first controller 13 or when each of the D-flip/flops 28 in the second controller 27 stores a logic low validity signal.

Consequently, even if power is not suspended because of the power suspension signal generated by the first controller 13, an individual core block 16 can have its power suspended by the associated second controller 27. Namely, a particular core block 16 will only receive power when parallel data to be processed is received by the core block 16.

Because the power suspension can be controlled on an individual core block basis, instead of suspending the power of the whole circuit, power consumption is reduced. This increases efficiency and reduces noise.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for suspending power of a processing system having a plurality of core blocks connected in series, comprising:

system power suspending means for receiving input data, and determining whether to suspend a supply of power to said processing system based on said input data;

a converter converting a format of said input data;

determining means for determining whether said converted input data is valid data, said valid data being data which will be processed by said plurality of core blocks; and a series of controllers shifting output from said determining means through said series of controllers, each said series controller temporarily storing said output from said determining means prior to shifting said output from said determining means to a next controller in said series of controllers, each controller being associated with one of said plurality of core blocks, each said controller controlling a supply of power to said associated core block based on output from said system power suspending means and said output from said determining means temporarily stored therein which indicates that the converted data is invalid.

2. The apparatus of claim 1, wherein each said controller suspends power to said associated core block when said output from said system power suspending means indicates to suspend power to said processing system.

3. The apparatus of claim 2, wherein each said controller suspends power to said associated core block when said output from said determining means temporarily stored therein indicates that said converted data is invalid.

4. The apparatus of claim 1, wherein
   said system power suspending means receives serial data as said input data; and
   said converter converts said serial data into parallel data.

5. The apparatus of claim 1, wherein each said controller includes a series of flip-flops shifting said output from said determining means through said series of flip-flops.

6. The apparatus of claim 5, wherein each said controller further comprises:
   an OR gate receiving output from each flip-flop in said series of flip-flops; and
   an AND gate receiving output from said OR gate and said output from said system power suspending means.

7. The apparatus of claim 1, wherein said system power suspending means comprises:

a detector detecting a predetermined bit stream in said input data;
   a counter increasing a count value when said detector detects said predetermined bit stream in said input data, and resetting said count value when said detector does not detect said predetermined bit stream in said input data; and
   a system controller generating output indicating to suspend power to said processing system when said count value exceeds a predetermined threshold.

8. A method for suspending power of a processing system having a plurality of core blocks connected in series, comprising:
   (a) receiving input data;
   (b) First determining whether to suspend a supply of power to said processing system based on said input data;
   (c) converting a format of said input data;
   (d) Second determining whether said converted input data is valid data, said valid data being data which will be processed by said plurality of core blocks;
   (e) shifting output from said second determining step through a series of controllers such that each said controller temporarily stores said output from said second determining step prior to shifting said output from said second determining step to a next controller in said series of controllers, each controller being associated with one of said plurality of core blocks; and
   (f) controlling, using each controller, a supply of power to said associated core block based on output from said first determining step and said output from said second determining step temporarily stored in said controller.

9. The method of claim 8, wherein said controlling step suspends power to said plurality of core blocks when said output from said first determining step indicates to suspend power to said processing system.

10. The method of claim 9, wherein said controlling step suspends power to a core block associated with one of said controllers when said output from said second determining step temporarily stored therein indicates that said converted data is invalid.

11. The method of claim 8, wherein said controlling step suspends power to a core block associated with one of said controllers when said output from said second determining step temporarily stored therein indicates that said converted data is invalid.

12. The method of claim 8, wherein
   said receiving input data-step receives serial data as said input data; and
   said converting step converts said serial data into parallel data.

13. The method of claim 8, wherein said first determining step comprises:
   (b1) detecting a predetermined bit stream in said input data;
   (b2) increasing a count value when said detecting a predetermined bit step detects said predetermined bit stream in said input data;
   (b3) resetting said count value when said detecting a predetermined bit step does not detect said predetermined bit stream in said input data; and
   (b4) generating output indicating to suspend power to said processing system when said count value exceeds a predetermined threshold.

* * * * *